May 29, 1956   G. H. WERDEN   2,747,566
COLLAPSIBLE CAMP COOKER
Filed March 17, 1955   3 Sheets-Sheet 1

George H. Werden
INVENTOR.

May 29, 1956 G. H. WERDEN 2,747,566
COLLAPSIBLE CAMP COOKER
Filed March 17, 1955 3 Sheets-Sheet 2
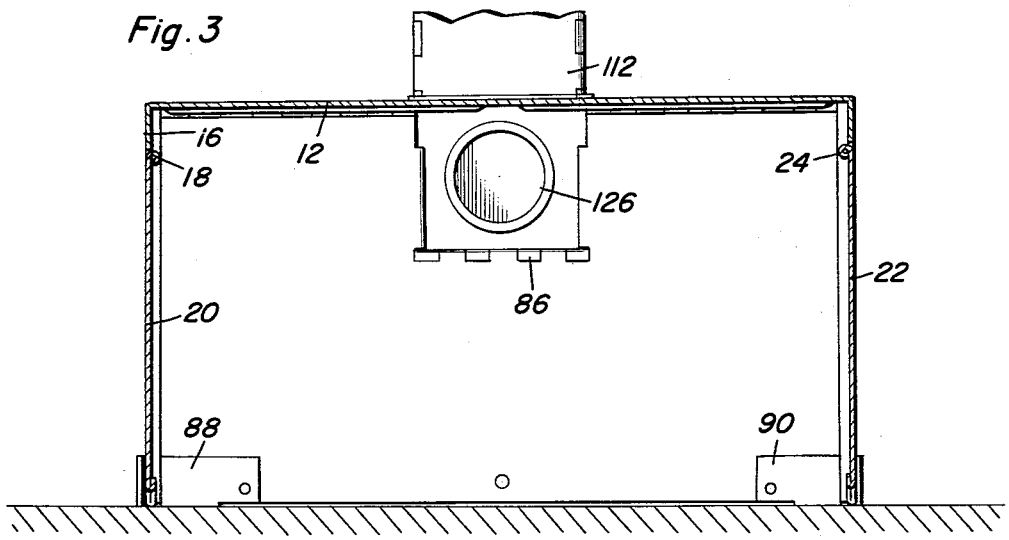
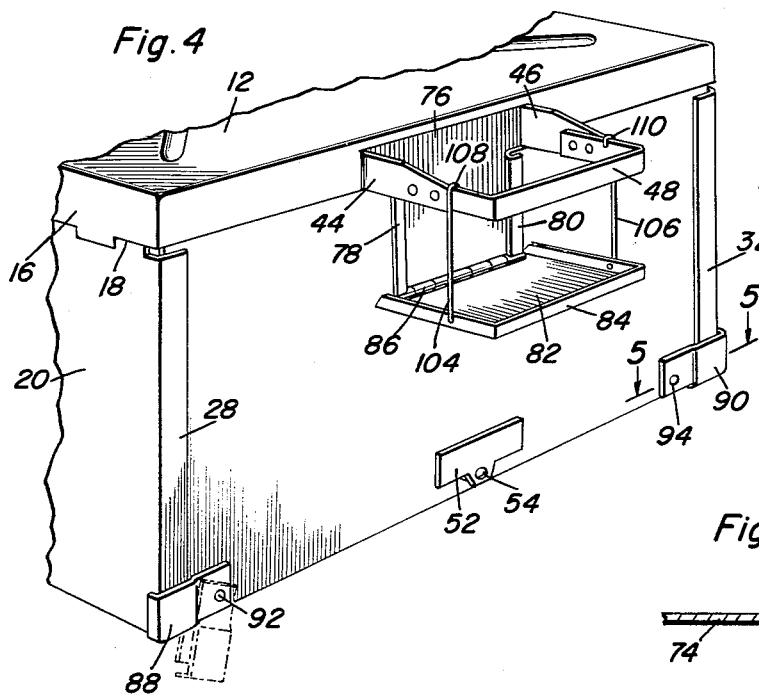
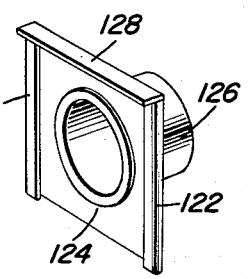
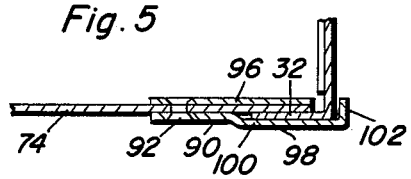
George H. Werden
INVENTOR.
BY
Attorneys May 29, 1956 G. H. WERDEN 2,747,566
COLLAPSIBLE CAMP COOKER
Filed March 17, 1955 3 Sheets-Sheet 3
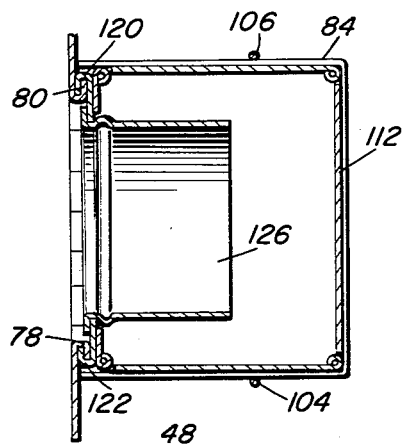
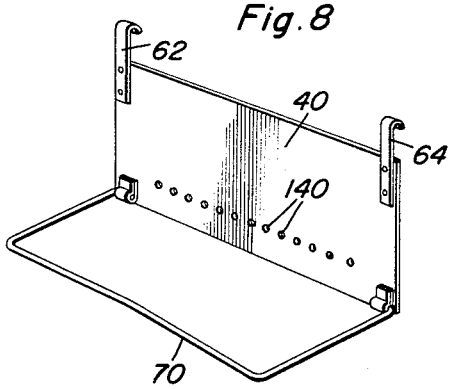
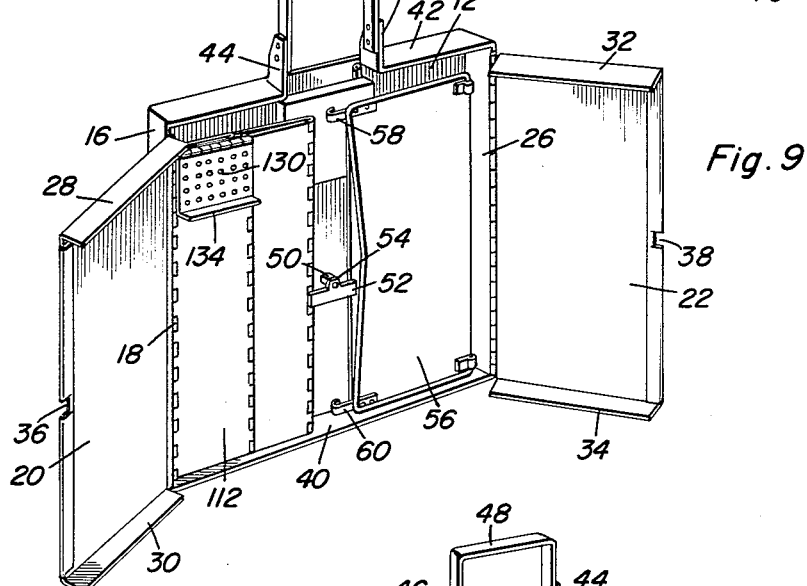
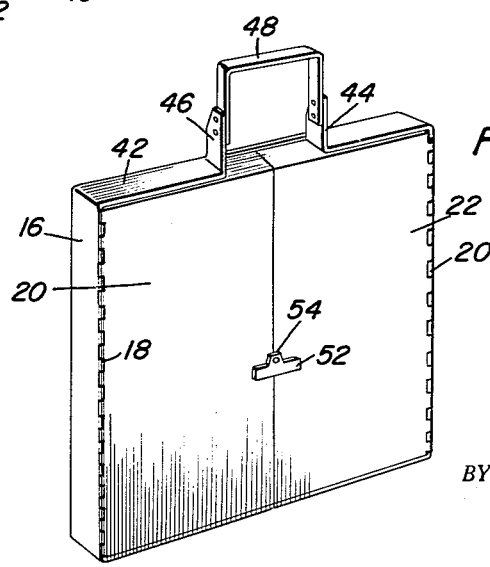
George H. Werden
INVENTOR.
BY *Clarence A. O'Brien*
*and Harvey B. Jacobson*
Attorneys

United States Patent Office 2,747,566
Patented May 29, 1956

2,747,566

COLLAPSIBLE CAMP COOKER

George H. Werden, Englewood, Colo.

Application March 17, 1955, Serial No. 494,887

7 Claims. (Cl. 126—9)

This invention relates to a collapsible cooking and heating apparatus especially adapted for use by a camper, sportsman, hunter and like persons for use in numerous ways.

The primary object of the present invention resides in the provision of an easily portable camp stove or tent warmer which will enable fires to be safely built, and provided with equipment for arresting sparks and the like while properly venting the fire.

The construction of this invention features a camp cooker employing a novel arrangement of parts, including a U-shaped member which not only serves as a handle for carrying the entire camp cooker but which also serves to support and hold the chimney of the camp cooker when the device is in an erected position.

A further object of the invention lies in the provision of a camp cooker which may be alternatively used as a cooking stove or as a tent warmer, and which employs novel means for locking the various parts of the assembly in position.

Still further objects and features of this invention reside in the provision of a camp cooker that is simple in construction, collapsible so as to occupy a very small space when in a folded position, and which is inexpensive to manufacture, thereby permitting wide distribution and utilization.

These, together with the various ancillary objects and features of the invention which will become apparent as the following description proceeds, are attained by this collapsible camp cooker, a preferred embodiment of which has been illustrated in the accompanying drawings, by way of example only, wherein:

Figure 3 is an enlarged vertical sectional view as taken along the plane of line 3—3 in Figure 1;

Figure 4 is an enlarged partial perspective view of the rear portions of the invention shown with the chimney member removed therefrom;

Figure 5 is a sectional detail view as taken along the plane of line 5—5 in Figure 4, and showing the locking latches in an enlarged scale;

Figure 6 is a sectional detail view taken along the plane of line 6—6 in Figure 2 and illustrating in an enlarged scale the construction of the vent fitting;

Figure 7 is a perspective view of the vent fitting;

Figure 8 is a perspective view of the various parts of the front member;

Figure 9 is a perspective view of the invention shown in a partially collapsed position; and Figure 10 is a perspective view of the invention shown in a completely collapsed position.

Figure 1:
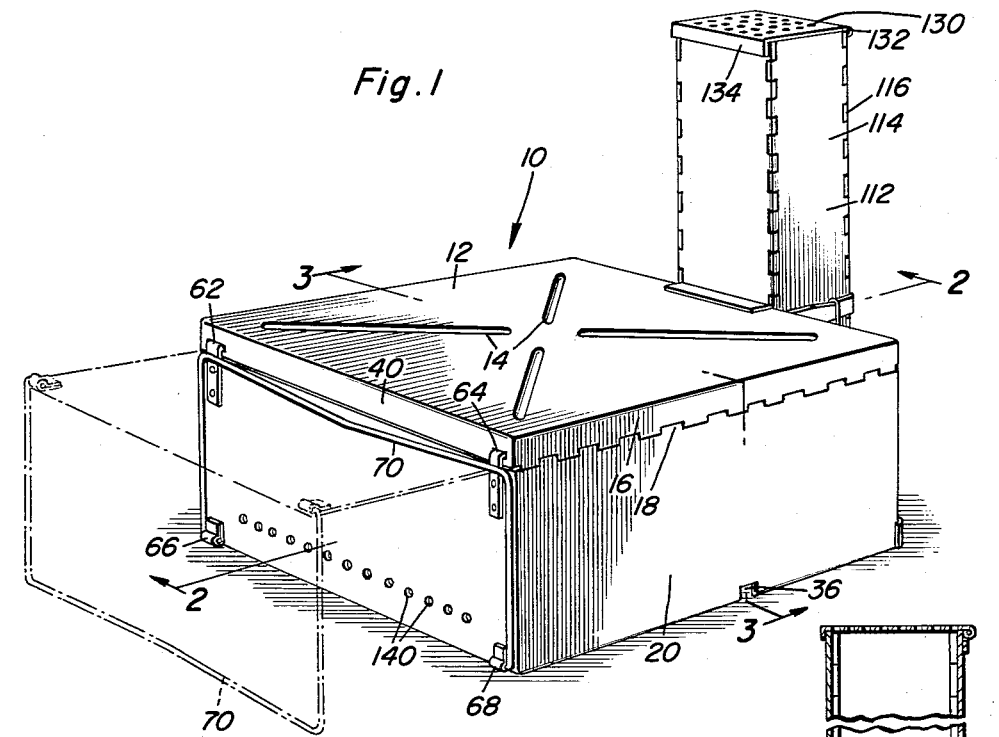
Figure 1 is a perspective view of the invention showing the collapsible camp cooker in an erected position, and showing in phantom lines an alternate position of the front member.

With continuing reference to the accompanying drawings wherein like reference numerals designate similar parts throughout the various views, reference numeral 10 is used to generally designate the collapsible camp cooker comprising the present invention. This collapsible camp cooker 10 includes a top member 12 which may have suitable ribs as at 14 of any desired or convenient configuration for rigidifying the top member 12 and for providing a grill-like surface for the top member 12. Hingedly secured to the flange 16 depending from the side of the top member 12 by means of a piano hinge 18 is a side member 20 and a like side member 22 is hingedly secured, as at 24, to the flange 26.

Each of the side members 20 and 22 is provided with flanges, as at 28, 30 and 32, 34, respectively. Further, the edges of the side members 20 and 22 are notched, as at 36 and 38.

The top member 12 is provided with a front flange 40 and a rear flange 42. The center portions of the rear flange 42 are outwardly struck, as at 44 and 46, and have riveted or otherwise secured thereto a substantially U-shaped member 48 which serves the purpose of a handle for the entire collapsible camp cooker when in a collapsed position.

Affixed by means of a stud 50 to the undersurface of the rear plate 74 is a pivoted latch member 52 which is adapted to engage the side members 20 and 22 when in a collapsed position, the notches 36 and 38 serving to enable the side members 20 and 22 to by-pass the latch member 52 when the latch member 52 is rotated from the horizontal position as is shown in Figures 9 and 10 to a vertical position wherein the pivoted portion 54 of the T-shaped latch member 52 will pass through the notches 36 and 38.

A front closure member 56 is provided, and has hooks 58 and 60 receivable in slots 62 and 64 provided in the flange 40. By means of brackets 66 and 68, a U-shaped stand 70 is pivotally attached to the front closure plate 56 so that the front closure plate may be moved from the position as is shown in solid lines in Figure 1 to the position as is shown in phantom lines in Figure 1.

Hingedly secured to the rear edge of the top member 12 and forwardly of the flange 32 by means of a piano hinge, as at 72, is the back plate 74 which has an opening, as at 76, in the upper portions thereof, as can be best seen in Figure 4. The U-shaped member 48 is in alignment with the opening 76 and the struck out portions 44 and 46 aid in the definition of the opening 76. Forming the vertical edges of the opening 76 are guides 78 and 80 and a support plate 82 having a peripheral flange 84 is hingedly secured to the back plate 74 by means of a piano hinge 86.

Hingedly secured to the lower portions of the back member 74 are a pair of locking latches 88 and 90 rotatably mounted by means of rivets 92 and 94. These latches, as can be best seen in Figure 5, are each constructed from two sections, that is, an inner section 96 and an outer section 98. The outer section 98 is provided with an offset portion 100 as well as an inwardly turned flange portion 102 so that the flanges 28 and 32, respectively, of the side members 20 and 22 can be received between the inner and outer sections 96 and 98 of the latches 88 and 90. This will serve to hold the side members 20 and 22 as well as the rear members 74 locked in a position normal to each other and to the top member 12.

A pair of hangers 104 and 106 are secured to the support plate 82 and have hook-like portions, as at 108 and 110 adapted to engage the U-shaped member 48. This will enable the support plate 82 to be held substantially horizontal when the collapsible camp cooker is in an erected position.

Receivable in the confines of the U-shaped member 48 and onto the support plate 82 within the bounds of the flange 84 is a chimney 112 formed of four sections 114 each hingedly secured to each other, as at 116, by means of piano hinges so as to enable the chimney section 112 to readily lie flat when it is in a collapsed position.

Figure 2:
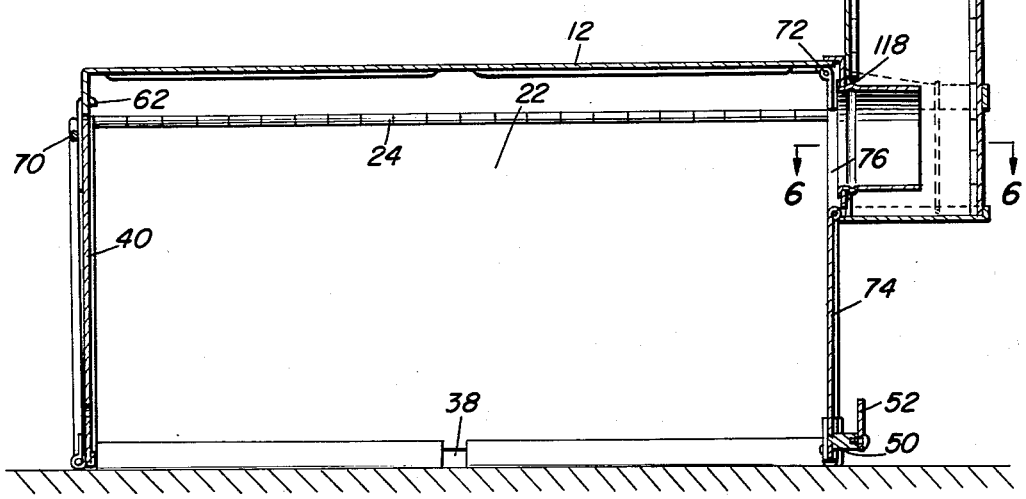
Figure 2 is an enlarged vertical sectional view as taken along the plane of line 2—2 in Figure 1.

The forwardmost section 114 of the chimney member 112 is provided with an opening 118 therein, see Figure 2, in alignment with the opening 76. Engageable with the guides 78 and 80 are retaining flanges 120 and 122 on a vent fitting 124 having a pipe 126 attached thereto and being provided with a flange 128 on the upper surface for overlying the top surface of the edge of the top member 12. The fitting 124 is provided for directing flow of exhaust and combustion gases from the combustion chamber formed by the side walls 20 and 22, the top member 12 and the back member 74.

A spark arresting flap 130 is hingedly secured as at 132 to the chimney member 112 and is provided with a flange 134 for holding this spark arrester 130 in position.

The operation of this camp cooker is quite simple. With the front plate 56 in its extended position, the invention is designed to serve as a camp stove wherein the ashes may be easily retained and which will permit further fuel to be easily added. However, when it is desired to utilize the invention as a tent stove or heater and when it is desired to leave the invention unattended for any period of time, the front plate or member 40 may be positioned as is shown in Figure 1 in the solid lines, thereby confining the fire. Suitable venting apertures 140 may be provided for the front member 40.

It is to be recognized that this collapsible camp cooker may be easily collapsed into the position as is shown in Figures 9 and 10, permitting the device to be easily carried from one location to another.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claims.

What is claimed as new is as follows:

1. A collapsible cooker comprising a top member, side members hingedly secured to said top member, a back member hingedly secured to said top member, said back member having an opening therein, a U-shaped member secured to said back member, a support plate hingedly secured to said back member, means engaging said U-shaped member for holding said support plate in a horizontal position, and a collapsible chimney member received in said U-shaped member and seating on said support plate, said chimney member communicating with said opening.

2. A collapsible cooker comprising a top member, side members hingedly secured to said top member, a back member hingedly secured to said top member, said back member having an opening therein, a U-shaped member secured to said back member, a support plate hingedly secured to said back member, means engaging said U-shaped member for holding said support plate in a horizontal position, and a collapsible chimney member received in said U-shaped member and seating on said support plate, said chimney member communicating with said opening, said means including hangers attached to said support plate.

3. A collapsible cooker comprising a top member, side members hingedly secured to said top member, a back member hingedly secured to said top member, said back member having an opening therein, a U-shaped member secured to said back member, a support plate hingedly secured to said back member, means engaging said U-shaped member for holding said support plate in a horizontal position, and a collapsible chimney member received in said U-shaped member and seating on said support plate, said chimney member communicating with said opening, guides attached to said back member, and an adapter fitting engaged in said guides extending into said chimney member.

4. A collapsible cooker comprising a top member, side members hingedly secured to said top member, a back member hingedly secured to said top member, said back member having an opening therein, a U-shaped member secured to said back member, a support plate hingedly secured to said back member, means engaging said U-shaped member for holding said support plate in a horizontal position, and a collapsible chimney member received in said U-shaped member and seating on said support plate, said chimney member communicating with said opening, said side members having vertical flanges and locking latches pivotally secured to said back member for engaging said flanges.

5. A collapsible cooker comprising a top member, side members hingedly secured to said top member, a back member hingedly secured to said top member, said back member having an opening therein, a U-shaped member secured to said back member, a support plate hingedly secured to said back member, means engaging said U-shaped member for holding said support plate in a horizontal position, and a collapsible chimney member received in said U-shaped member and seating on said support plate, said chimney member communicating with said opening, said side members having vertical flanges and locking latches pivotally secured to said back member for engaging said flanges, said locking latches having inner and outer members receiving portions of said back member and said flanges therebetween.

6. A collapsible cooker comprising a top member, side members hingedly secured to said top member, a back member hingedly secured to said top member, said back member having an opening therein, a U-shaped member secured to said back member, a support plate hingedly secured to said back member, means engaging said U-shaped member for holding said support plate in a horizontal position, and a collapsible chimney member received in said U-shaped member and seating on said support plate, said chimney member communicating with said opening, said side members having vertical flanges and locking latches pivotally secured to said back member for engaging said flanges, said locking latches having inner and outer members receiving portions of said back member and said flanges therebetween, said means including hangers attached to said support plate.

7. A collapsible cooker comprising a top member, side members hingedly secured to said top member, a back member hingedly secured to said top member, said back member having an opening therein, a U-shaped member secured to said back member, a support plate hingedly secured to said back member, means engaging said U-shaped member for holding said support plate in a horizontal position, and a collapsible chimney member received in said U-shaped member and seating on said support plate, said chimney member communicating with said opening, said side members having vertical flanges and locking latches pivotally secured to said back member for engaging said flanges, said locking latches having inner and outer members receiving portions of said back member and said flanges therebetween, said means including hangers attached to said support plate, guides attached to said back member, and an adapter fitting engaged in said guides extending into said chimney member.

No references cited.